United States Patent
Tredoux et al.

(10) Patent No.: US 9,515,836 B2
(45) Date of Patent: Dec. 6, 2016

(54) SYSTEM AND METHOD FOR LOCATION ASSURANCE USING PASSIVE COMPUTATIONAL TAGS

(71) Applicant: XEROX CORPORATION, Norwalk, CT (US)

(72) Inventors: Gavan L. Tredoux, Penfield, NY (US); James M. Sweet, Rochester, NY (US); Wendell L. Kibler, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 432 days.

(21) Appl. No.: 13/852,238

(22) Filed: Mar. 28, 2013

(65) Prior Publication Data

US 2014/0298035 A1 Oct. 2, 2014

(51) Int. Cl.
*H04L 9/32* (2006.01)
*H04W 12/10* (2009.01)

(52) U.S. Cl.
CPC ........... *H04L 9/3297* (2013.01); *H04L 9/3234* (2013.01); *H04L 9/3247* (2013.01); *H04W 12/10* (2013.01); *H04L 2209/80* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,828,751 A | * | 10/1998 | Walker | G06Q 50/06 380/278 |
| 2002/0078354 A1 | * | 6/2002 | Sandhu et al. | 713/171 |
| 2003/0126446 A1 | * | 7/2003 | Debiez | G06F 21/80 713/178 |
| 2004/0143454 A1 | * | 7/2004 | Kimmel | G06F 19/322 705/2 |
| 2004/0172403 A1 | * | 9/2004 | Steele | G07C 9/00158 |
| 2004/0228284 A1 | * | 11/2004 | Tuinstra | 370/252 |
| 2005/0093702 A1 | * | 5/2005 | Twitchell, Jr. | G06K 7/0008 340/572.8 |
| 2006/0023679 A1 | * | 2/2006 | Twitchell, Jr. | H04Q 9/00 370/338 |
| 2008/0140841 A1 | * | 6/2008 | Ott | 709/226 |
| 2008/0302867 A1 | * | 12/2008 | Holberg | G06Q 30/02 235/375 |
| 2009/0106042 A1 | * | 4/2009 | Maytal et al. | 705/1 |
| 2009/0228300 A1 | * | 9/2009 | Hamel | G06Q 10/08355 705/2 |

(Continued)

*Primary Examiner* — Josnel Jeudy
*Assistant Examiner* — Phy Anh Vu
(74) *Attorney, Agent, or Firm* — MH2 Technology Law Group LLP

(57) ABSTRACT

In implementations, a computer-implemented method for location assurance is disclosed. The method can include receiving, by an application executing on a mobile computing device, an electronic token from a server, wherein the electronic token comprises a timestamp signed using a cryptographic signing algorithm; providing, by the application, the electronic token to a passive computational tag, wherein the electronic token is countersigned by the passive computational tag; receiving, by the application, the electronic token that was countersigned by the passive computational tag; and providing, by the application, the electronic token that was countersigned to the server.

16 Claims, 5 Drawing Sheets

(56) References Cited

U.S. PATENT DOCUMENTS

| | | | |
|---|---|---|---|
| 2011/0187505 A1* | 8/2011 | Faith | G06F 1/1694 340/10.1 |
| 2012/0133552 A1* | 5/2012 | Wu | G01S 19/10 342/357.23 |
| 2013/0104238 A1* | 4/2013 | Balsan et al. | 726/26 |
| 2014/0196143 A1* | 7/2014 | Fliderman | G06F 21/32 726/19 |
| 2014/0289822 A1* | 9/2014 | Wilson | G06Q 20/42 726/5 |
| 2015/0172059 A1* | 6/2015 | Tredoux | H04L 9/3247 713/176 |
| 2016/0180295 A1* | 6/2016 | Smith | G06Q 10/1091 705/32 |

* cited by examiner

SYSTEM AND METHOD FOR LOCATION ASSURANCE USING PASSIVE COMPUTATIONAL TAGS

FIELD

The present disclosure relates to location tracking. More particularly, the present disclosure relates to systems and methods for location assurance using passive computational tags.

BACKGROUND

In many cases, it is useful to have some assurance that locations have been visited, e.g. by service personnel, inspectors, delivery drivers and other people on official business. Those people may wish to pretend that they have visited the locations, in order to save themselves time and effort, or conversely those people may wish to allay suspicion that they have not visited the locations by providing proof that they have. An inexpensive means for proving beyond reasonable doubt that people or entities have indeed visited one or more locations would have wide applicability in service industries and regulated environments.

There are many applications that can make use of proof that a physical location was visited, whether by a truck driver, an inspector, service personnel, nurse, doctor or other officials and people or automated devices. Since visiting locations physically can be onerous, there is an incentive for people to pretend that they have physically visited a location when they really have not, and this sort of shirking is a well-known cultural phenomenon with wasteful costs to society and organizations.

Conventional approaches using a global positioning system (GPS) have many drawbacks. For example, GPS is not accessible everywhere, especially inside buildings with multiple stories, perhaps underground and obscured by concrete. Also, it is easy to claim loss of GPS reception as the reason why there is lack of proof that a location was visited. Products, such as GPS jammers, have been used to trigger this, for example, by truckers who deviate from their route. Further, GPS has limited accuracy and does not itself provide any assurance of the time window of the visit. There is currently no way to guarantee that GPS coordinates are not simply invented or otherwise faked. Any attempt to cross-check that, for example, by using magnetic bearings correlated with the coordinates is subject to the limitation that knowledge of the right bearings is in principle public too and can be manipulated to match the supplied coordinates. Given the above-noted deficiencies of the current approaches, what is needed is an improved method and system for location tracking and assurance.

SUMMARY

In implementations, a non-transitory computer readable storage medium comprising instruction that cause one or more processors to perform a method, the method including receiving, by an application executing on a mobile computing device, an electronic token from a server, wherein the electronic token comprises a timestamp signed using a cryptographic signing algorithm; providing, by the application, the electronic token to a passive computational tag, wherein the electronic token is countersigned by the passive computational tag; receiving, by the application, the electronic token that was countersigned by the passive computational tag; and providing, by the application, the electronic token that was countersigned to the server.

In implementations, a non-transitory computer readable storage medium is disclosed that comprises instruction that cause one or more processors to perform a method comprising: receiving, by a processor of a server, a request for an electronic token from a computing device; generating the electronic token based on the request that was received, wherein the electronic token comprises information related to an identification of the server and information related to a time that the request was received; signing the electronic token using a cryptographic signing algorithm; providing the electronic token that was signed to the computing device; receiving the electronic token that was countersigned by a passive computational tag; and determining a time interval between when the request that was received and when the electronic token that was countersigned was received to determine a location duration of the computing device with respect to the passive computational tag.

In implementations, a device is disclosed that comprises one or more processors; and a non-transitory computer readable medium comprising instructions that cause the one or more processors to perform a method comprising: receiving, by a processor of a server, a request for an electronic token from a computing device; generating the electronic token based on the request that was received, wherein the electronic token comprises information related to an identification of the server and information related to a time that the request was received; signing the electronic token using a cryptographic signing algorithm; providing the electronic token that was signed to the computing device; receiving the electronic token that was countersigned by a passive computational tag; and determining a time interval between when the request that was received and when the electronic token that was countersigned was received to determine a location duration of the computing device with respect to the passive computational tag.

In implementations, a computer-implemented method for location assurance is disclosed. The method can comprise receiving, by an application executing on a mobile computing device, an electronic token from a server, wherein the electronic token comprises a timestamp signed using a cryptographic signing algorithm; providing, by the application, the electronic token to a passive computational tag, wherein the electronic token is countersigned by the passive computational tag; receiving, by the application, the electronic token that was countersigned by the passive computational tag; and providing, by the application, the electronic token that was countersigned to the server.

In implementations, the timestamp can comprise timing information in coordinated universal time.

In implementations, the cryptographic signing algorithm can comprise an asymmetric encryption scheme and the timestamp is signed using a private key of the server.

In implementations, the cryptographic signing algorithm can comprise a symmetric encryption scheme and the timestamp is signed using a shared private key.

In implementations, the electronic token that was countersigned is countersigned by a private key of the passive computational tag.

In implementations, the electronic token that was countersigned comprises a first timestamp of when the electronic token was countersigned by the passive computational tag and a second timestamp of when the electronic token was received from the passive computational tag.

In implementations, the providing, by the application, the electronic token to a passive computational tag can comprise coupling the mobile computing device with the passive computational tag.

In implementations, the electronic token can comprise information related any, or combinations of, a random identifier, a cryptographic salt, and the server identifier.

In implementations, the electronic token that is countersigned by the passive computational tag can comprise a timestamp in a countersignature.

In implementations, the electronic token received from the server can be cryptographically signed using a private key of the server by applying the cryptographic signing algorithm to a cryptographic hash of contents of the electronic token and the timestamp.

In implementations, the countersigned electronic token received from the passive computational tag can be cryptographically signed used a private key of the passive computational tag by applying the cryptographic signing algorithm to a cryptographic hash of contents of the electronic token, the timestamp, and the electronic token that was signed by the server.

In implementations, the method can further comprise determining a continuous presence between the mobile computing device and a docketing station associated with passive computational tag; and receiving a stream of tokens from the server based on the continuous presence that was determined.

In implementations, the electronic token that was countersigned to the server can provide location assurance that the mobile computing device has a location within a predetermined range of the passive computational tag.

In implementations, a device is disclosed that can comprise one or more processors; and a non-transitory computer readable medium comprising instructions that cause the one or more processors to perform a method comprising: receiving an electronic token from a server, wherein the electronic token comprises a timestamp signed using a cryptographic signing algorithm; providing the electronic token to a passive computational tag, wherein the electronic token is countersigned by the passive computational tag; receiving the electronic token that was countersigned by the passive computational tag; and providing the electronic token that was countersigned to the server.

In implementations, the countersigned electronic token received from the passive computational tag can be cryptographically signed used a private key of the passive computational tag by applying the cryptographic signing algorithm to a cryptographic hash of contents of the electronic token, the timestamp, and the electronic token that was signed by the server.

In implementations, the device can further comprise instructions that cause the one or more processors to perform determining a continuous presence between the mobile computing device and a docketing station associated with passive computational tag; and receiving a stream of tokens from the server based on the continuous presence that was determined.

In implementations, the electronic token that was countersigned to the server can provide location assurance that the mobile computing device has a location within a predetermined range of the passive computational tag.

In implementations, a computer-implemented method for location assurance is disclosed that can comprise receiving, by a processor of a server, a request for an electronic token from a computing device; generating the electronic token based on the request that was received, wherein the electronic token comprises information related to an identification of the server and information related to a time that the request was received; signing the electronic token using a cryptographic signing algorithm; providing the electronic token that was signed to the computing device; receiving the electronic token that was countersigned by a passive computational tag; and determining a time interval between when the request that was received and when the electronic token that was countersigned was received to determine a location duration of the computing device with respect to the passive computational tag.

In implementations, the computer-implemented method can further comprise providing a stream of tokens to the computing device based on a continuous presence between the computing device and a docketing station associated with passive computational tag.

BRIEF DESCRIPTION OF THE DRAWINGS

The accompanying drawings, which are incorporated in and constitute a part of this specification, in connection with the description, illustrate various embodiments and exemplary aspects of the disclosed embodiments. In the drawings.

DETAILED DESCRIPTION

Reference will now be made in detail to exemplary embodiments, examples of which are illustrated in the accompanying drawings. When appropriate, the same reference numbers are used throughout the drawings to refer to the same or like parts.

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific exemplary embodiments. Electrical, mechanical, logical and structural changes may be made to the exemplary embodiments without departing from the spirit and scope of the present teachings. The following detailed description is, therefore, not to be taken in a limiting sense and the scope of the present teachings is defined by the appended claims and their equivalents.

In general, aspects consistent with the present teachings provide a method, a device, and a non-transitory computer-readable medium for allowing verification of a presence at a physical location within a time window using computing devices and passive computational radio-frequency identification (RFID) and/or near field communication (NFC) tags, which conversely also allows the visitor to prove presence at that location within that time window. The RFID/NFC tags can be affixed to locations and require no power source or other system integration. The tags might, for example, be placed on multifunctional devices (MFD) or equipment and used to prove that the equipment has been physically visited by service personnel. When the tag is visited, a signed time-stamped token is obtained from a server, for example, but not limited to a cloud-based server, by an application executing on the computing device, for example, but not limited to a mobile application executing on a mobile computing device. The application then uses a computational passive tag, affixed to a specific location, to sign the issued token a second time. The server or any other entity can then check the signature and verify both that the token was signed by the tag, and that the token which was signed by the tag was indeed issued by the server. This provides proof that the tag was visited physically, since only the tag knows its secret key.

Figure 1:
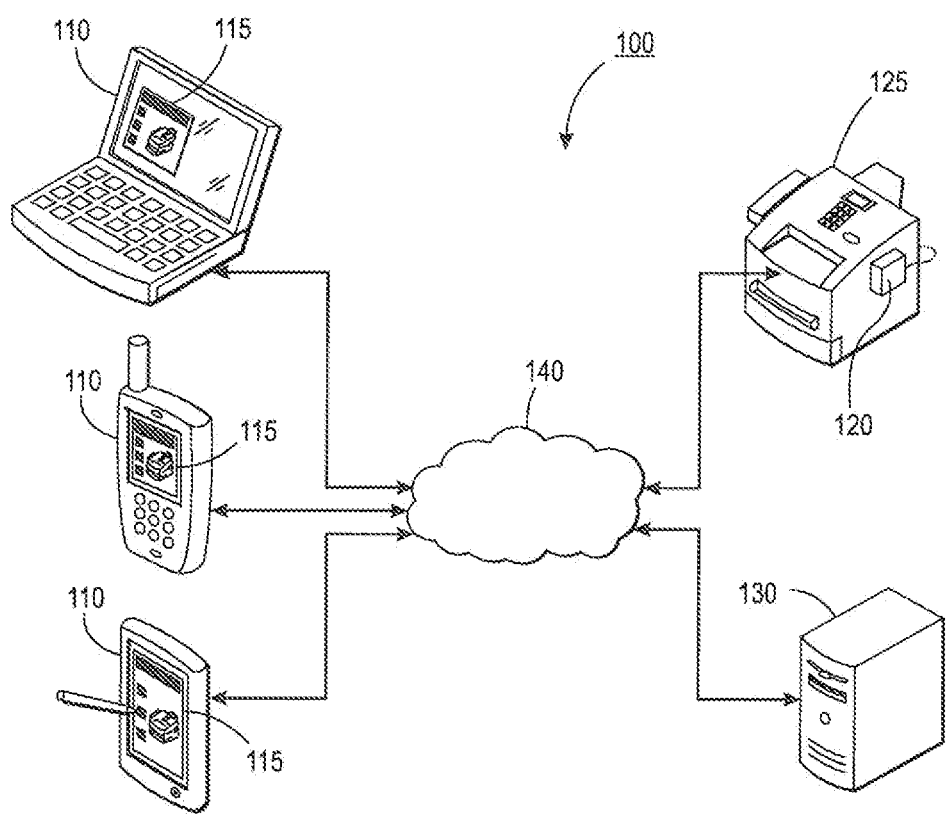
FIG. 1 is a diagram depicting an exemplary network arrangement in accordance with teachings of the present disclosure.

FIG. 1 is a diagram depicting an exemplary network arrangement 100 in which a location of a user with computing device 110 can be determined in relation to passive computational tag or "tag" 120 by communication with token server 130, in accordance with teachings of the present disclosure. As depicted in FIG. 1, computing device 110 can any kind of device capable of communicating with tag 120 and token server 130. Computing device, for example, but not limited to, can be a personal computing device, such as a smartphone, a cellular phone, a handheld mobile device, a table device, a laptop computer, a portable computer, and the like, capable of executing custom applications.

Computing device 110 can communicate with tag 120 and token server 130 during the course of running token management application or "application" 115. Applications 115 may refer to any kind of program or application that is capable of operating or executing on computing device 110, whether to provide features intended for user interaction or simply to provide underlying services used by computing device 110 or an operating system executing thereon. For example, throughout this application, for the purpose of explaining certain exemplary operations only, reference will be made to one or more application 115 that provides functionality for allowing location of the computing device 110, and thus the user of the device, to be determined in relation to passive computation tag 120 by interaction with token server 130.

Computing device 110 can communicate with token server 130 over communications network 140. Application 115 running on computing device 110 can be operable to instruct computing device 110 to open a communication channel with token server 130 over communication network 140 and can be operable to initiate communications with tag 120.

Token server 130 can be a centrally located server in proximity to computing device 110 and/or tag 120, a distributed server located over many remote locations, or a cloud-based server. Token server 130 can be any kind of device capable of communicating with computing device 110 in order to provide location determination of computing device 110 with respect to tag 120. Token server 130 can be operable to issue and verifiably signing time-stamped tokens on demand from computing device 110. Token server can include cryptographic functionality including, but not limited to, token generation, cryptographic key storage, cryptographic or digital signature functionality, as well as, other functionality such as token storage and record or log keeping functionality.

Communications network 140 may comprise one or more wired networks, such as the Internet, a wide area network (WAN), a local area network (LAN), etc., and may also provide for wireless communications using wireless protocols, such as wireless Ethernet, Global System for Mobile Communications (GSM), Enhanced Data rates for GSM Evolution (EDGE), Universal Mobile Telecommunications System (UMTS), Worldwide Interoperability for Microwave Access (WiMAX), Long Term Evolution (LTE), etc.

Tag 120, also called "smart tag" or "info tag," is a passive device that includes computer-readable memory and a radio chip attached to an antenna that is operable to communicate using near field communication (NFC) technology or over radio frequencies (RF). Since tag 120 does not include a power source to power operations and relies upon other devices to provide power through magnetic induction, such as computing device 110, the term "passive" is applied to characterize these tags. For example, but not limited to, tag 120 can be a NFC tag of types 1-4. The computer-readable storage on tag 120 can information, including, but not limited to, identification information and a cryptographic key to be used in the location determination of computing device 110, in accordance with the teachings of the present disclosure.

Tag 120 can be affixed to a fixed physical location, such as a wall, or can be affixed to a device, such as a multifunctional device (MFD) 125 like a document processing device or a vending machine. Other suitable locations and devices with which tag 120 can be affixed to or associated with could also be used as would be apparent. Tag 120 can also be built into the physical housing of a device, protected behind a transparent plaque, or otherwise conveniently incorporated more or less noticeably into a physical environment. Tags such as 120 can also be integrated with objects they are affixed to using, for example, an active near-field communication (NFC) hotspot. Tag 120 can securely incorporate a tamper-proof private key component (using some asymmetric encryption scheme such as the well-known RSA method) and is capable of signing digital information, passively using the power provided by its interrogator (the RFID/NFC or similar reader). This signature can be verified using a trusted public key, following principles that are now widely known.

By way of a non-limiting example, a service person, official or other user carries a mobile device, such as computing device 110, which has hardware capable of invoking tag 120, and can also run application 115 for obtaining the information which is to be signed by tag 120. Computing device 110 is able to connect to a network containing token server 130 through communications network 140. Application 115 executing on computing device 110 can be operable to contact token server 130 over communications network 140 to request and obtain a token. The token is signed by token server 130 and contains a current timestamp, e.g. in universal time, using, for example, an asymmetric encryption protocol. The signature can be checked by anyone who has the trusted public key corresponding to the secret key of token server 130. This public key can be published or distributed using any of the well-known methods for doing so. Alternatively, token server 130 can sign the token using a symmetric key instead, and then only token server 130 can verify that it issued the token. By signing the token, entities can be prevented from making up tokens with fake timestamps by pre-creating tokens for later reuse when physically visiting tag 120 once.

Application 115 executing on computing device 110 invokes tag 120 and passes the issued token for countersignature by tag 120. Tag 120 uses its own private key to countersign the (already) signed token. Anyone can verify this countersignature using the trusted public key of the tag, e.g. token server 130 can perform that verification. Application 115 can then passes the countersigned token back to token server 130, which then knows that the definite time window for the visit was between the token timestamp and the time the countersigned token was received back from computing device 110.

This process can be repeated for every location visited by the service person or official, resulting in a sequence of time-stamped tokens signed by tag 120 present at each location. Reliability of the information obtained by the tokens can be, assured since there is no feasible way to guess or forge the required signatures and tokens, since the keys required for their creation are kept secret and securely embedded in each tag 120. The locations have to be visited in order to obtain the signatures. However, the tags which provide the signatures require no power source and do not need any other integration with the objects they are affixed to, such as MFDs.

In implementations, knowledge that a user remains continuously in proximity to tag 120 for a period of time, as would be the case of a user accessing MFD 125 where access rights were granted based on the person remaining at the MFD 125, could be useful. The user could place computing device 110 on or near tag 120, possibly on a conveniently located cradle or docketing station (not shown) where the user may continue to use computing device 110. In this instance, token server 130 could continuously issue tokens to tag 120 for it to counter sign. When the cycle is broken due to removing computing device 110 from tag 120, token server 120 can immediately act on that knowledge and perform actions such as terminate authorization, log the duration that the user was present, or any other action appropriate for the process.

Figure 2:
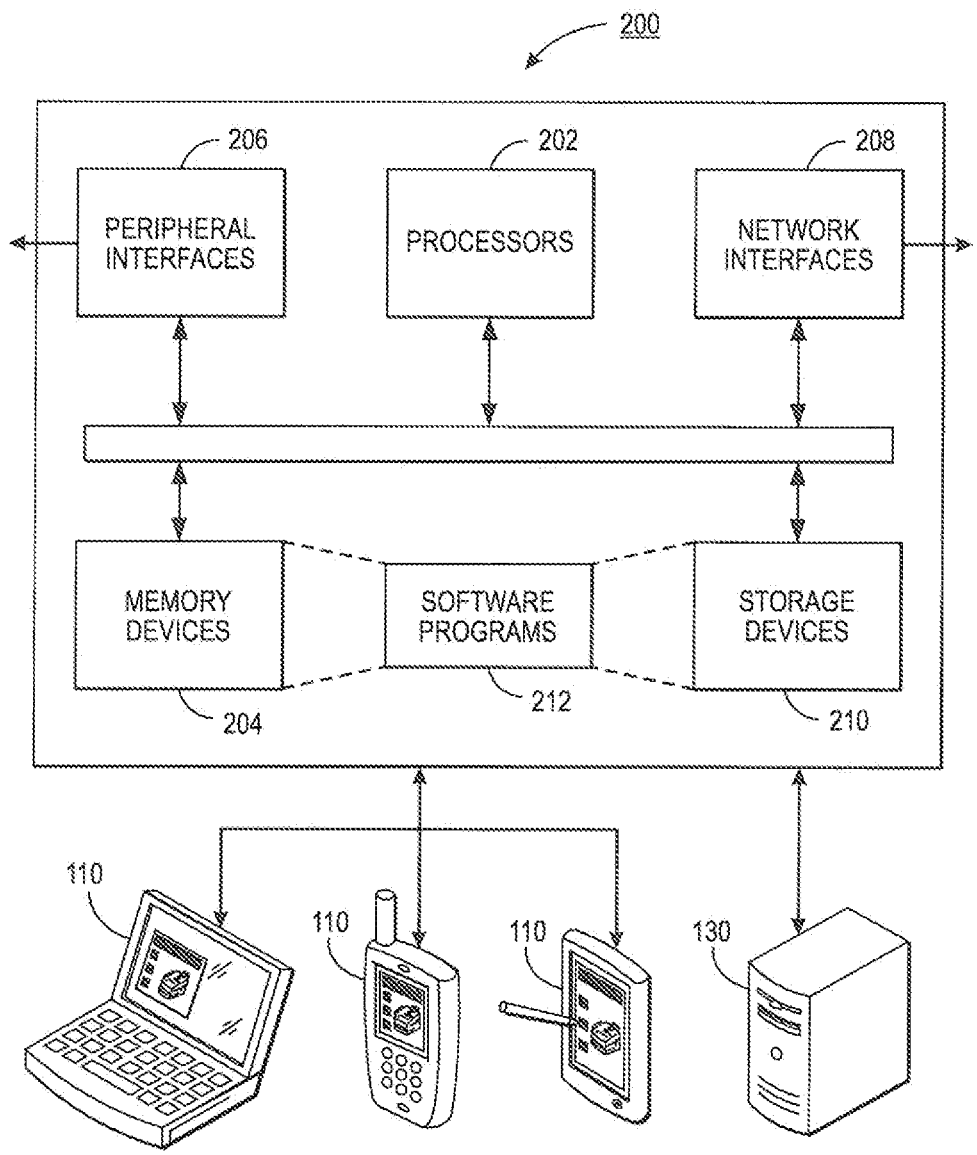
FIG. 2 is a diagram depicting an exemplary hardware configuration for computing device 200, such as computing device 110 or token server 130, that may be used to perform one or more of the processes as described herein.

FIG. 2 is a diagram depicting an exemplary hardware configuration for computing device 200, such as computing device 110 or token server 130, that may be used to perform one or more of the processes as described herein. While FIG. 2 illustrates various components contained in computing device 200, one skilled in the art will realize that FIG. 2 is one example of a computing device and that additional components can be added and existing components can be removed.

As illustrated in FIG. 2, computing device 200 can include one or more processors 202 of varying core configurations and clock frequencies. Computing device 200 can also include one or more memory devices 204 that serve as a main memory during the operation of computing device 200. Computing device 200 can also include one or more peripheral interfaces 206, such as keyboards, mice, touchpads, computer screens, touchscreens, etc., for enabling human interaction with and manipulation of computing device 200.

Computing device 200 can also include one or more network interfaces 208 for communicating via one or more networks, such as Ethernet adapters, wireless transceivers, or serial network components, for communicating over wired or wireless media using protocols, such as Ethernet, wireless Ethernet, Global System for Mobile Communications (GSM), Enhanced Data rates for GSM Evolution (EDGE), Universal Mobile Telecommunications System (UMTS), Worldwide Interoperability for Microwave Access (WIMAX), Long Term Evolution (LTE), etc. Computing device 200 can also include one or more storage device 210 of varying physical dimensions and storage capacities, such as flash drives, hard drives, random access memory, etc., for storing data, such as images, files, and program instructions for execution by the one or more processors 202. One or more software programs 212 can be stored in the one or more memory devices 404 and/or on in the one or more storage devices 210. For example, the one or more software program can include the OS 208, the data usage service 202, and any other software program utilized by computing device 200.

In embodiments, the components of computing device 200 need not be enclosed within a single enclosure or even located in close proximity to one another. Those skilled in the art will appreciate that the above-described componentry are examples only, as computing device 200 can include any type of hardware componentry, including any necessary accompanying firmware or software, for performing the disclosed embodiments. Computing device 200 can also be implemented in part or in whole by electronic circuit components or processors, such as application-specific integrated circuits (ASICs) or field-programmable gate arrays (FPGAs).

Figure 3:
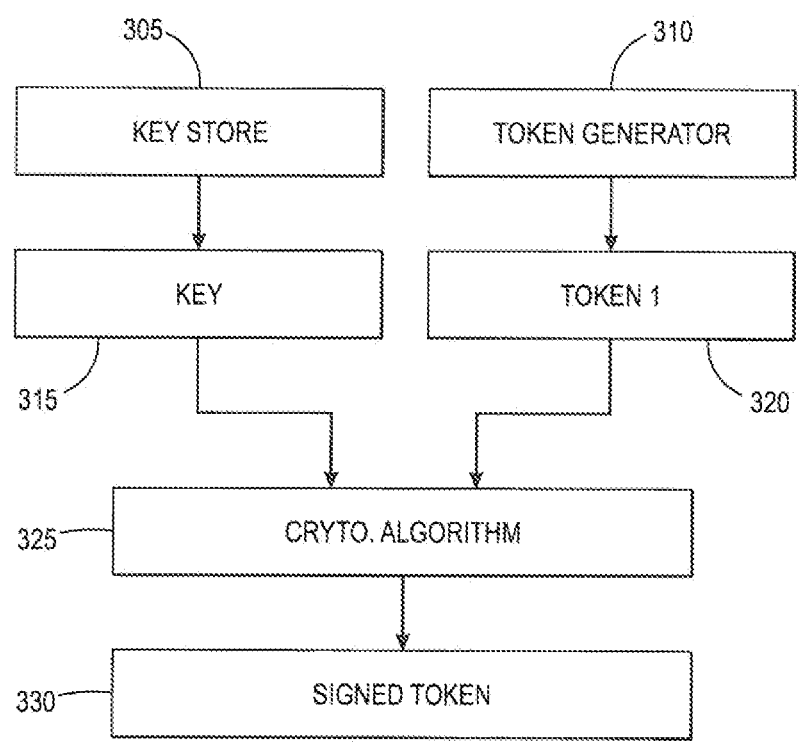
FIG. 3 is a diagram depicting an exemplary hardware configuration for token server 300, such as token server 130, that may be used to perform one or more of the processes as described herein.

FIG. 3 is a diagram depicting an exemplary configuration for token server 300, such as token server 130, that may be used to perform one or more of the processes as described herein. While FIG. 3 illustrates various components contained in token server 300, one skilled in the art will realize that FIG. 3 is one example of a token server and that additional components can be added and existing components can be removed.

As illustrated in FIG. 3, token server 300 can include cryptographic key store 305 stored in memory devices 204 or storage devices 210, which is where one or more cryptographic keys can be stored. Token server 300 also includes token generator 310 that is operable to generate one or more tokens. By way of a non-limiting example, when a token is requested by computing device 110, cryptographic key 315 from cryptographic key store 305 and token 320 generated by token generator 310 can be provided to cryptographic or digital signing algorithm 325, which can be stored in either memory devices 204 or storage devices 210. Cryptographic signing algorithm 325 can use an algorithm such as SHA1. Other similar signing algorithms can also be used. Cryptographic signing algorithm 325 can produce a signed token 330 by applying cryptographic key 315 to token 320, which can then be provided to computing device 110. Token server 130 can also include one or more hash algorithm, such as a message digest algorithm hash like MD5 or MD6, a secure hash algorithm has like SHA-2 or SHA-3, or another hash algorithm, as needed or desired.

Figure 4:
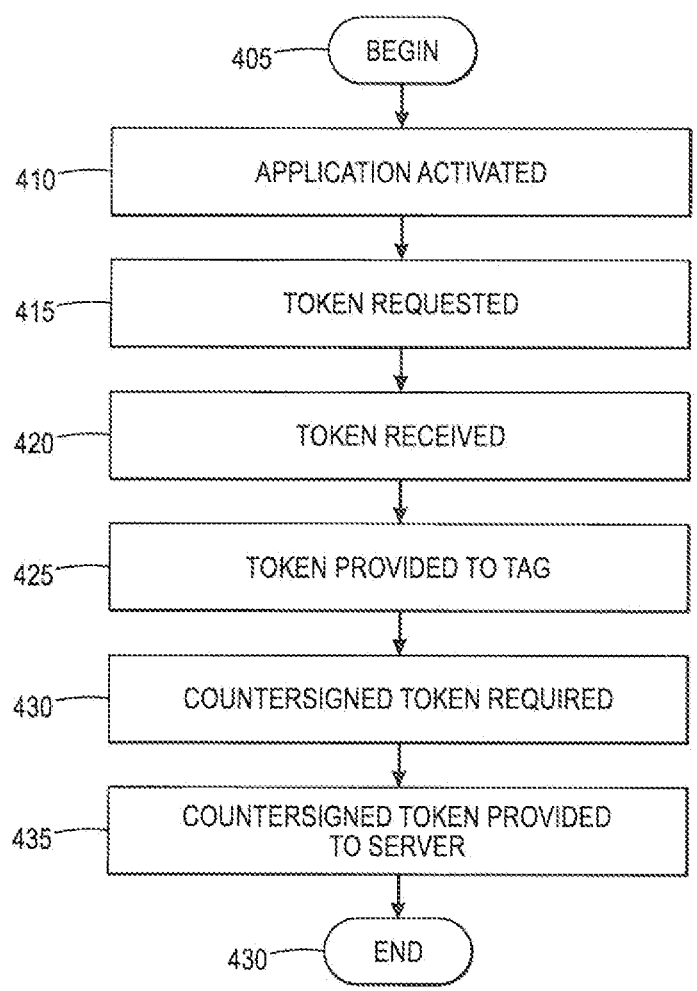
FIG. 4 depicts an example process by which computing device 110 interacts with token server 130 and tag 120, in accordance with the present teachings.

FIG. 4 depicts an example process by which computing device 110 interacts with token server 130 and tag 120, in accordance with the present teachings. The process begins at 405. At 410, application 115 is activated on computing device 110 by the user. For example, as user nears or is proximity to tag 120, user can activate application 115 on computing device by selecting an icon or button on computing device 110. At 415, application 115 can cause computing device 110 to provide a request for a token from token server 130. At 420, computing device 110 can receive a message from token server 130 including the token cryptographically signed by a cryptographic key, either an asymmetric private key or a secret symmetric key, using a cryptographic signature algorithm. The token can include information including, but not limited to, identification information and a temporal identifier, such as a timestamp at which either the token was generated or the request for the token was received from computing device 110. At 425, application 115 causes computing device 110 to provide the cryptographically signed token to tag 120. At 430, computing device 110 receives a countersigned token from tag 120. The countersigned token is the token provided to tag 120, but with the token cryptographically signed with a cryptographic key of tag 120 using a cryptographic signature algorithm. For example, the cryptographic key of tag 120 can be an asymmetric private key or a secret symmetric key stored in the computer-readable medium of tag 120. At 435, application 115 causes computing device 110 to provide the countersigned token to token server 130, Token server 130 can then record the time that the countersigned token was received back from computing device 110 and optionally store the countersigned token in a memory. The process can end at 440 or return to any of the preceding points in the process.

Figure 5:
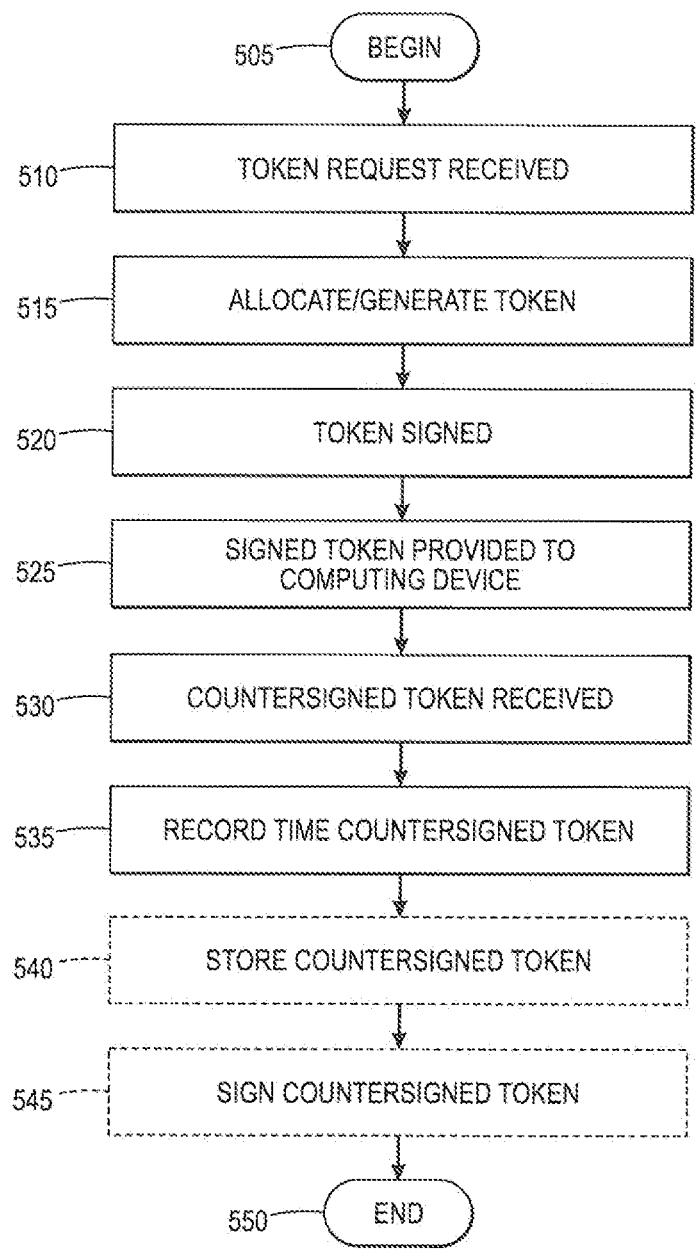
FIG. 5 depicts an example process by which token server 130 interacts with computing device 110, in accordance with the present teachings.

FIG. 5 depicts an example process by which token server 130 interacts with computing device 110, in accordance with the present teachings. The process beings at 505. At 510, token server 130 receives a request for a token from computing device 110. At 515, the token can be allocated, if already generated, or the token can be generated by token generator 305. By way of a non-limiting example, the token can include, but not limited to, one or more of the following: identification information, such as a random ID, a cryptographic salt, and a token server identifier. The cryptographic salt can include random data that can be added to the token to mitigate a brute-force attack to uncover the private key. The token can also include temporal information in the form of a timestamp related to when the token was created or when the request was received from computing device 110. The temporal information can be encoded using a coordinated universal time (UTC) standard. At 520, the token can be cryptographically signed by a cryptographic key, either an asymmetric private key or a secret symmetric key, using a cryptographic signature algorithm. By way of a non-limiting example, the cryptographic signature can be performed using a private key of token server 130 on a hash of the token and the timestamp issued by token server 130. At 525, the cryptographically signed token can be provided to computing device 110. In this example, the token would now look as follows: (a) token, including information such as a random ID, a cryptographic salt, and an ID of token server 130 and (b) issued timestamp (e.g. UTC). A signature (c), is issued by token server 130, using the private key of token server 130, and is computed on a hash of (a) and (b). At 530, token server 130 can receive the countersigned token from computing device 110. The countersigned token can be a signed by the private key of tag 120 on a computed hash of the token, the issued timestamp of token server 130, and the signature of token server 130. In this example, the countersigned token would look as follows: a hash of (a), (b), and (c). At 535, token server 130 can record the time that the countersigned token was received from computing device 110. At 540, token server 130 can optionally store the countersigned token in a memory.

At 545, token server 130 can optionally sign a version of the token that is augmented with the current receipt timestamp, providing an alternative means for later transmission of the token and verification by other parties of the time window of the visit, without requiring token server 130 to store the token. In this example, the token would now look as follows: (a) token, including information such as a random ID, a cryptographic salt, and an ID of token server 130 and (b) issued timestamp (e.g. UTC). A signature (c), is issued by token server 130, using the private key of token server 130, and is computed on a hash of (a) and (b). A countersignature, (d) issued by tag 120, using the private key of tag 120, is computed on a hash of (a), (b) and (c). A received timestamp, (e), (e.g. UTC) is proved by token server 130 and a signature is generated by token server 130 of (a), (b), (c), (d), and (e). The process can end at 550 or return to any of the preceding points in the process.

In implementations, aspects of the present teachings can also be combined with GPS to augment its notion of physical proximity with geographic coordinates. This can conveniently be done through the GPS receiver on the computing device 110.

Certain embodiments described above can be performed as a computer applications or programs. The computer program can exist in a variety of forms both active and inactive. For example, the computer program can exist as one or more software programs, software modules, or both that can be comprised of program instructions in source code, object code, executable code or other formats; firmware program(s); or hardware description language (HDL) files. Any of the above car be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A computer-implemented method for location assurance comprising:

receiving, by an application executing on a mobile computing device, an electronic token from a token server over a network, wherein the electronic token comprises a timestamp signed using a cryptographic digital signature algorithm by the token server, wherein the mobile computing device comprises a hardware processor;

providing, by the application, the electronic token to a passive computational tag based on an instruction from the hardware processor, wherein the electronic token is countersigned by the passive computational tag using the cryptographic digital signature algorithm;

receiving, by the application, the electronic token that was countersigned by the passive computational tag;

providing, by the application, the electronic token that was countersigned by the passive computational tag to the token server over the network;

creating, by the token server, an electronic log of activities associated with a physical proximity of the mobile computing device and the passive computational tag based on the electronic token that was countersigned;

providing, by the token server, access rights to a user of the mobile computing device associated with the passive computation tag based on the electronic token that was countersigned, determining, by the token server, a continuous presence between the mobile computing device and a docketing station associated with the passive computational tag; and receiving a stream of tokens from the token server based on the continuous presence that was determined, wherein the electronic token provides a verifiable location assurance based on the electronic log that the mobile computing device and the passive computation tag were in communication range based on the timestamp and that the electronic token was countersigned by the passive computational tag.

2. The method according to claim 1, wherein the timestamp comprises timing information in coordinated universal time.

3. The method according to claim 1, wherein the cryptographic digital signature algorithm comprises an asymmetric encryption scheme and the timestamp is signed using a private key of the token server.

4. The method according to claim 1, wherein the cryptographic digital signature algorithm comprises a symmetric encryption scheme and the timestamp is signed using a shared private key.

5. The method according to claim 1, wherein the electronic token that was countersigned is countersigned by a private key of the passive computational tag.

6. The method according to claim 1, wherein the electronic token that was countersigned comprises a first timestamp of when the electronic token was countersigned by the passive computational tag and a second timestamp of when the electronic token was received from the passive computational tag.

7. The method according to claim 1, wherein the providing, by the application, the electronic token to a passive computational tag comprises coupling the mobile computing device with the passive computational tag.

8. The method according to claim 1, wherein the electronic token comprises information related any, or combinations of, a random identifier, a cryptographic salt, and a server identifier.

9. The method according to claim 1, wherein the electronic token that is countersigned by the passive computational tag comprises a timestamp in a countersignature.

10. The method according to claim 1, wherein the electronic token received from the token server is cryptographically signed using a private key of the token server by applying the cryptographic digital signature algorithm to a cryptographic hash of contents of the electronic token and the timestamp.

11. The method according to claim 1, wherein the countersigned electronic token received from the passive computational tag is cryptographically signed using a private key of the passive computational tag by applying the cryptographic digital signature algorithm to a cryptographic hash of contents of the electronic token, the timestamp, and the electronic token that was signed by the token server.

12. The method according to claim 1, wherein the providing the electronic token that was countersigned to the token server provides location assurance that the mobile computing device has a location within a predetermined range of the passive computational tag.

13. A device comprising:
one or more hardware processors; and
a non-transitory computer readable medium comprising instructions that cause the one or more hardware processors to perform a method comprising:

receiving, by an application executing on a mobile computing device, an electronic token from a token server, wherein the electronic token comprises a timestamp signed using a cryptographic digital signature algorithm;

providing, by the application, the electronic token to a passive computational tag, wherein the electronic token is countersigned by the passive computational tag;

receiving, by the application, the electronic token that was countersigned by the passive computational tag;

providing, by the application, the electronic token that was countersigned to the token server over a network, creating, by the token server, an electronic log of activities associated with a physical proximity of the mobile computing device and the passive computational tag based on the electronic token that was countersigned;

providing, by the token server, access rights to a user of the mobile computing device associated with the passive computation tag based on the electronic token that was countersigned, determining, by the token server, a continuous presence between the mobile computing device and a docketing station associated with the passive computational tag; and receiving a stream of tokens from the token server based on the continuous presence that was determined;

wherein the electronic token provides a verifiable location assurance based on the electronic log that the mobile computing device and the passive computation tag were in communication range based on the timestamp and that the electronic token was countersigned by the passive computational tag.

14. The device according to claim 13, wherein the countersigned electronic token received from the passive computational tag is cryptographically signed using a private key of the passive computational tag by applying the cryptographic digital signature algorithm to a cryptographic hash of contents of the electronic token, the timestamp, and the electronic token that was signed by the token server.

15. The device according to claim 13, wherein the providing the electronic token that was countersigned to the server provides location assurance that the mobile computing device has a location within a predetermined range of the passive computational tag.

16. A computer-implemented method for location assurance comprising:

receiving, by a hardware processor of a token server over a network, a request for an electronic token from a computing device;

generating, by the hardware processor, the electronic token based on the request that was received, wherein the electronic token comprises information related to an identification of the token server and information related to a time that the request was received;

signing, by the hardware processor of the token server, the electronic token using a cryptographic digital signature algorithm;

providing, by the hardware processor of the token server over the network, the electronic token that was signed to the computing device;

receiving, by the hardware processor of the token server over a network, the electronic token that was countersigned by a passive computational tag;

determining, by the hardware processor of the token server, a time interval between when the request for the electronic token was received and when the electronic token that was countersigned was received to determine a location duration of the computing device with respect to the passive computational tag;

creating, by the hardware processor of the token server, an electronic log of activities associated with a physical proximity of the mobile computing device and the passive computational tag based on the electronic token that was countersigned;

providing, by the hardware processor of the token server, access rights to a user of the mobile computing device associated with the passive computation tag based on the electronic token that was countersigned;

determining, by the hardware processor of the token server, a continuous presence between the mobile computing device and a docking station associated with the passive computational tag; and receiving a stream of tokens from the hardware processor of the token server based on the continuous presence that was determined;

wherein the electronic token provides a verifiable location assurance based on the electronic log that the mobile computing device and the passive computation tag were in communication range based on a time when the electronic token that was countersigned by the passive computational tag.

* * * * *